April 14, 1964   J. N. SANDVEN ETAL   3,128,918
SOFT ICE CREAM DISPENSING SYSTEM
Filed Jan. 13, 1961   2 Sheets-Sheet 2
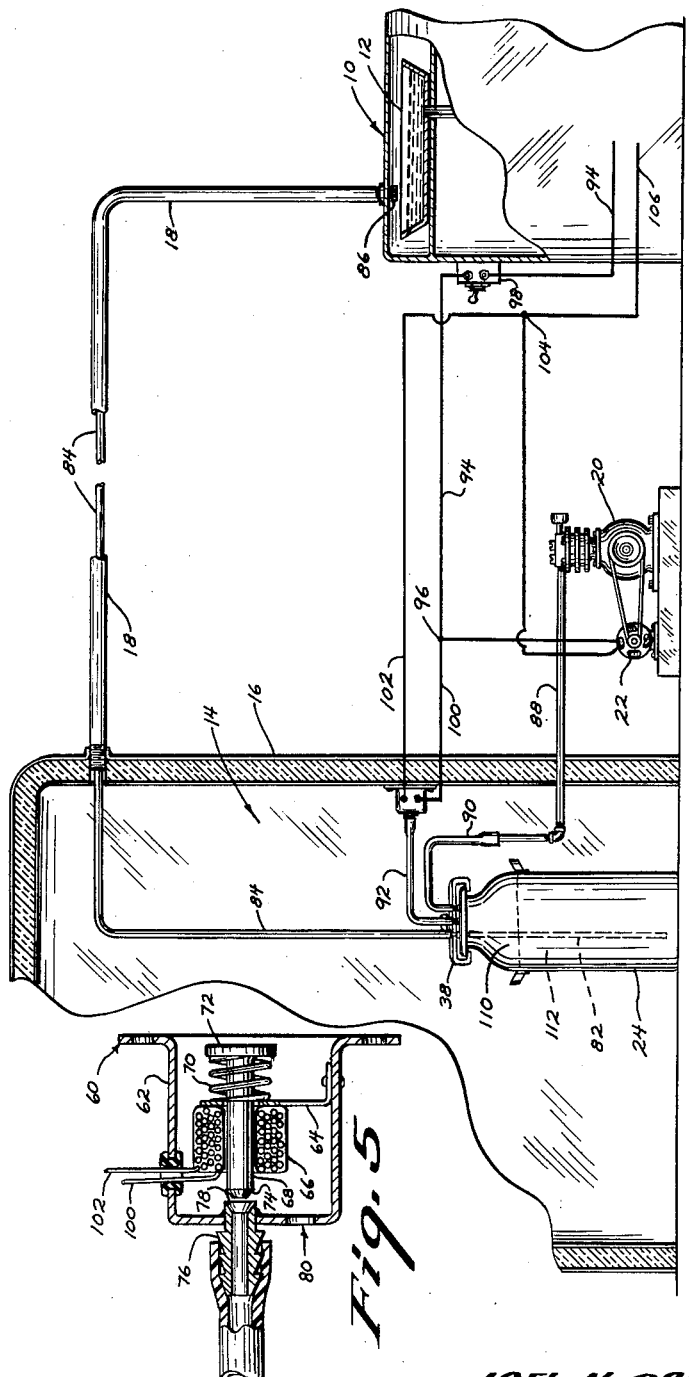
INVENTORS
JOEL N. SANDVEN
SIMON H. HAUNSPERGER
WITNESS
NORMAN G. TRAVISS
BY
ATTORNEYS

United States Patent Office 3,128,918
Patented Apr. 14, 1964

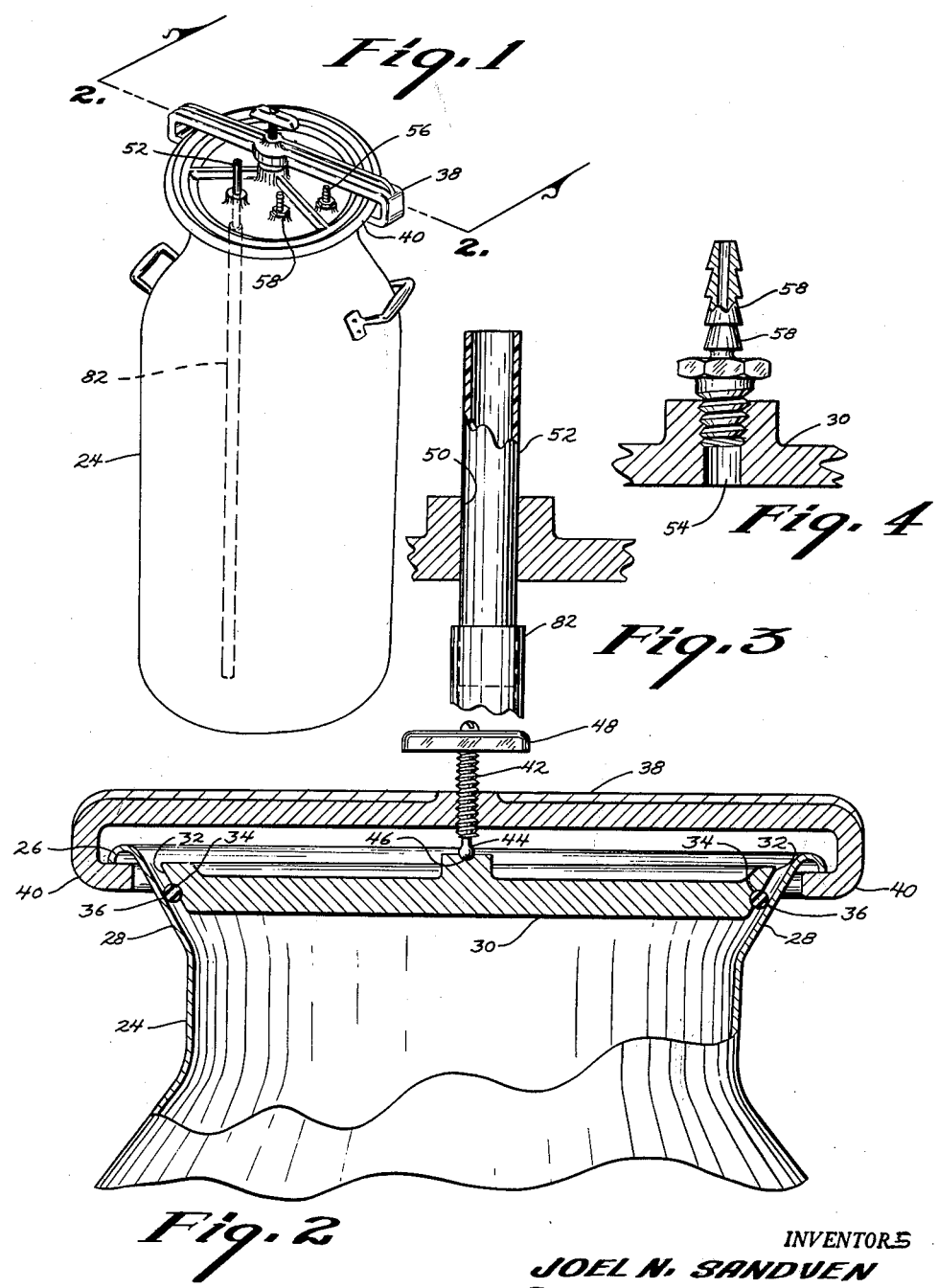

3,128,918
SOFT ICE CREAM DISPENSING SYSTEM
Joel N. Sandven and Simon H. Haunsperger, Kellogg, Iowa, assignors to Joel N. Sandven
Filed Jan. 13, 1961, Ser. No. 82,572
2 Claims. (Cl. 222—205)

Our invention relates to material handling and more specially to a device for properly moving soft ice cream from its storage area to the dispensing machine.

Soft ice cream stores have increased in such numbers in recent years that these stores have apparently made a permanent appearance on the American scene. Although these stores vary in architecture and design, they all have at least two essential functional elements, namely, a refrigerated room in which to store the soft ice cream, and secondly, dispensing machine to discharge the material to the ultimate consumer. The normal procedure for moving the soft ice cream from the refrigerated room to the dispensing machine is as follows: The operator enters the cooler, opens the heavy dairy can in which the soft ice cream normally is stored; pours the soft ice cream into a smaller vessel; and then manually carries the vessel out of the refrigerated room where it is then poured into the mix pan on top of the dispensing unit. The manual effort involved in this operation is objectionable, particularly when it is considered that the filled dairy cans involved usually weigh over one hundred pounds. This ice cream handling procedure also requires frequent trips into and out of refrigerated room or cooler which adds to the inefficiency of maintaining the temperature within the cooler at a predetermined low level. The operator of such a system finds that he must leave the forward part of his store unattended while securing the soft ice cream from the cooler and waiting customers are sometimes offended at the delay. The removal of the soft ice cream from the dairy can to the vessel and thence to the mix pan on the dispensing machine invites spilling, and injuries from lifting the heavy dairy cans are not uncommon.

Therefore, the principal object of our invention is to provide a soft ice cream dispensing system that will not require any manual lifting of the material involved while moving it from the dairy can inside the cooler to the mix pan on the dispensing machine.

A further object of our invention is to provide a soft ice cream dispensing system that will not require the operator to enter the cooler each time additional material is needed.

A still further object of our invention is to provide a soft ice cream dispensing system that will prevent the wastage or spilling of the soft ice cream during the handling operation.

A still further object of our invention is to provide a a soft ice cream dispensing system that is completely sanitary and which can be easily cleaned.

A still further object of our said invention is to provide a soft ice cream dispensing system which will permit the operator to normally fill the mix pan on his dispensing machine by remote control.

A still further object of our invention is to provide a soft ice cream dispensing system that is economical of manufacture, durable in use and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

FIG. 1 is a perspective view of a dairy can with our special lid attached;

FIG. 2 is a sectional view of our dairy can lid taken on line 2—2 of FIG. 1;

FIG. 3 is a partial sectional view through the material port in our lid element;

FIG. 4 is a partial sectional view taken through one air port in our lid element;

FIG. 5 is a sectional view of our solenoid-actuated control valve element; and

FIG. 6 is a schematic view of our device showing the relation of the cooler, the dispensing machine and the inter-connecting electrical and material supply elements.

We have used the numeral 10 to generally designate a soft ice cream dispensing machine having a soft ice cream mix pan 12 supported in its upper portion. The exact structure of the dispensing machine 10 does not constitute a part of our invention.

A refrigerated room or cooler 14 defined by walls 16 is located at a point remote from the dispensing machine 10. The conventional door and cooling apparatus normally associated with cooler 14 are not shown. A hollow, rigid and elongated conduit 18 extends between cooler 14 and dispensing machine 10. It is preferable to have the end of conduit 18 at wall 16 at a higher elevation than its opposite end. Conduit 18 should leave cooler 14 in an overhead position and should terminate in dispensing machine 10 at a point over mix pan 12. An air compressor 20 with an electric motor 22 can be located either within cooler 14 or without walls 16 as shown in FIG. 6.

A conventional metal dairy can 24 with soft ice cream therein is normally stored within cooler 14. The upper end of can 24 is tapered upwardly and outwardly, as shown in FIG. 2, and a metal bead or lip 26 extends around the circular opening in the top of the can. This detailed structure of the can is typical of most dairy cans now in use. The numeral 28 designates the tapered portion of the can just described. The conventional dairy can lid is removed from can 24 and our lid 30 is substituted therefor for purposes of removing the soft ice cream from the can. Circular lid 30 has tapered edges 32 which contain an endless arcuate groove 34. Groove 34 is adapted to partially receive the resilient endless sealing ring 36 which is constructed of rubber or the like and which is circular in cross section as shown in FIG. 2. Sealing ring 36 is of sufficient diameter that it is slightly placed under tension as it is placed in groove 34 so that this tension will yieldably hold the ring in place. As shown in FIG. 2, lid 30 is adapted to dwell at a level below the top of can 24 and the ring 36 is adapted to engage the inner surface of the tapered portion 28 of the can so as to allow lid 30 to seal the interior thereof. An elongated clamp 38 with hook elements 40 on its opposite ends is adapted to extend across the top of can 24 to allow the hook elements to engage the lower edge of lip 32. Bolt 42 vertically extends through a threaded hole in the center of clamp 38 and rounded bearing element 44 on the lower end of the bolt is adapted to movably engage and bear against a small pocket 46 located in lid 30 directly below the bolt. Handle 48 on the upper end of the bolt 42 assists in the selective rotation of the bolt.

Vertical bore 50 extends through lid 30 and a hollow plastic tube 52 is pressure driven into bore 50 so as to be rigidly affixed to the lid. The upper and lower ends of tube 52 extend beyond the upper and lower surfaces of lid 30 as shown in FIG. 2. Two partially threaded bores 54 vertically extend through lid 30 and are adapted to receive conventional air hose connecting elements 56 and 58 which extend upwardly from the top of the lid as shown in FIG. 4.

A solenoid valve element 60 is secured to the wall 16 on the inside of cooler 14 in any convenient fashion. Valve element 60 is comprised of housing 62 and housing bracket 64 of insulated material, supports the solenoid coil 66 in conventional fashion. Solenoid plunger 68 is slidably mounted within coil 66 in conventional fashion. Normally expanded spring 70 embraces one end portion of plunger 68 and extends between bracket 64 and plunger head 72. The end 74 of plunger 68 is tapered inwardly as shown in FIG. 5. A hollow air hose connecting element 76 is secured in a suitable opening in housing 62 so that the longitudinal axis of the hose connecting element is in direct alignment with the longitudinal axis of plunger 68. The open end 78 of the hose connecting element 76 is tapered so as to receive the tapered end 74 of plunger 68 when the solenoid coil is electrically excited. The seating of plunger 68 in the end 78 of the hose connecting element 76 serves to seal the end of the hose connecting element. As shown in FIG. 5, spring 70 normally keeps plunger 68 completely free of engagement with the hose connecting element 76 so that the passage of air through the connecting element will be completely unobstructed. An air exhaust hole 80 can be located in the solenoid housing 62.

An elongated plastic tube 82 can be telescopically forced on the lower end of tube 52 in lid 30. As shown in FIG. 6, tube 82 is long enough to reach substantially to the bottom of can 24. A flexible elongated plastic hose 84 has one of its ends detachably secured to the upper end of tube 52. Hose 84 has a small enough diameter that it can be slidably inserted into a through conduit 18 to a point just above mix pan 12 in dispensing machine 10. A detachable friction cap 86 can be placed on the end of hose 84 that is inserted through conduit 18 to prevent the hose from picking up any foreign material during the insertion process. The cap 86 can then be removed from hose 84 through any convenient access opening in the dispensing machine.

A pipe 88 can extend from air compressor 20 through wall 16 into cooler 14. Flexible hose 90 can then detachably interconnect the pipe 88 and air hose connecting element 56. Again, air compressor 20 could also be conveniently located within the cooler 14 as well as outside the cooler, as depicted in FIG. 6. Fexible hose 92 interconnects the air hose connecting element 58 on lid 30 with the air hose connecting element 76 on solenoid valve 60.

FIG. 6 shows the schematic wiring diagram of our device. Line 94 is connected to a source of electrical energy and extends to terminal 96 which can be located in any junction box located at any convenient place, such as within cooler 14. Switch 98 can be imposed within line 94 in conventional fashion, and switch 98 is preferably mounted on or in the close proximity of dispensing machine 10. Line 100 can then connect terminal 96 with one end of the solenoid coil 66. Line 102 then connects the other end of solenoid coil 66 with terminal 104 which can be located in the same junction box as terminal 96. Line 106 can connect terminal 96 with one conventional terminal on compressor motor 22, and line 108 can connect the other motor terminal with terminal 104. Line 106 then extends from terminal 104 back to the source of electrical energy. Thus, it is seen that when switch 98 is closed the motor 22 immediately starts and solenoid plunger 68 immediately seats in and seals the air hose connecting element 76.

When the lid 30 is placed on can 24 in the manner described, and the hose or tube elements 82, 84, 90 and 92 are connected to the components described above, the operator can then remove cap 86 from the end of tube 84. When switch 98 is closed, compressed air from the actuated air compressor 20 is forced into the upper portion 110 of can 24 through pipe 88, tube 90 and air hose connecting element 56. The increased air pressure in portion 110 exerts a force on the soft ice cream 112 in the lower portion of the cam and causes the soft ice cream to move upwardly through tubes 82, 52 and 84 where it eventually is discharged into mix pan 12. The compressed air in the upper portion of the cam 24 cannot escape through tube 92 because this tube is sealed by the excited solenoid valve element 60 in the manner described above. When the operator determines that sufficient ice cream has been deposited in mix pan 12, he immediately opens switch 98 which causes compressor motor 22 to stop, thus interrupting the supply of compressed air to can 24. Ordinarily, the compressed air in the top of can 24 would continue to push soft ice cream through tube 84 even after the compressor 20 had stopped. However, the separation of solenoid plunger 68 from air hose connecting element 76 at the same instant that switch 98 is opened allows the compressed air in the top of can 24 to be immediately and instantaneously discharged. Thus, the operator can have absolute control over the amount of ice cream being supplied to his dispensing machine and this control may be manifested by merely operating switch 98.

Our equipment can be quickly and easily cleaned by detaching each of the tube or hose elements from its respective components, except for tube 52 which is rigidly secured to lid 30. Lid 30 can be easily removed from can 24 and the lid and tubes or hoses can be easily washed. The absence of threaded connections between tube 52 and lid 30 and the two tubes 82 and 84 makes these elements easier to clean and further enables the operator to maintain a high sanitary condition.

Thus, from the foregoing, it is seen that our device will at least accomplish all of its stated objectives.

Some changes may be made in the construction and arrangement of our soft ice cream dispensing system without departing from the real spirit and purpose of our invention, and it is our intention to cover by our claims, any modified forms of structure or use of mechanical equivalents which may be reasonably included within their scope.

We claim:

1. The combination of a refrigerated room and a soft ice cream dispensing machine having a mix pan therein, a container in said room adapted to hold a quantity of soft ice cream, lid means on said container for sealing the interior thereof from the outside atmosphere, said lid having three openings extending therethrough for placing the inside of said container in communication with the outside, an air compressor means in communication with one of said openings in said lid for supplying compressed air into said container, an air exhaust means in communication with a second of said openings in said lid to exhaust air from the interior thereof, an electrical control circuit including a switch means, a solenoid operated valve connected to said circuit and adapted to close said exhaust means, a spring means in engagement with said valve for normally holding said valve open, said air compressor having a motor connected to said circuit, and said valve means adapted to be closed when said compressor is operating by closing said switch means and energizing said control circuit, the third of said openings having a smooth uniform surface extending through said lid means, a first hollow straight tube forcibly fit into and extending through said third opening, said first hollow tube having its first end terminating beyond the exterior surface of said lid means and the other end terminating beyond the interior surface of said lid means within the interior of said container, a second hollow tube detachably forcibly receiving the other end of said first tube and thence extending downwardly towards the bottom of said container, a third tube detachably forcibly receiving the first end of said first tube and extending to the close proximity of said mix pan, and a hollow conduit extending from said room to a point on said dispensing machine adjacent said mix pan, and said third tube being slidably and detachably resting in and extending through said hollow conduit to said mix pan.

2. The combination of a refrigerated room and a soft ice cream dispensing machine having a mix pan therein, a container in said room adapted to hold a quantity of soft ice cream, lid means on said container for sealing the interior thereof from the outside atmosphere, said lid having three openings extending therethrough for placing the inside of said container in communication with the outside, an air compressor means in communication with one of said openings in said lid for supplying compressed air into said container, an air exhaust means in communication with a second of said openings in said lid to exhaust air from the interior thereof, an electrical control circuit including a switch means, a solenoid operated valve connected to said circuit and adapted to close said exhaust means, a spring means in engagement with said valve for normally holding said valve open, said air compressor having a motor connected to said circuit, and said valve means adapted to be closed when said energizing said control circuit, the third of said openings having a smooth uniform surface extending through said lid means, a tube in communication with said third opening and extending to a position adjacent said mix pan for communication therewith, and a hollow conduit extending from said room to a point on said dispensing machine adjacent said mix pan, and said tube being slidably and removably resting in and extending through said hollow conduit into said dispensing machine.

References Cited in the file of this patent

UNITED STATES PATENTS

| | | |
|---|---|---|
| 2,423,679 | Bethke | July 8, 1947 |
| 2,929,535 | Fairbanks | Mar. 22, 1960 |
| 3,050,217 | Mackey | Aug. 21, 1962 |